United States Patent [19]

Reber et al.

[11] Patent Number: 5,940,595
[45] Date of Patent: Aug. 17, 1999

[54] ELECTRONIC NETWORK NAVIGATION DEVICE AND METHOD FOR LINKING TO AN ELECTRONIC ADDRESS THEREWITH

[75] Inventors: William L. Reber, Schaumburg, Ill.; Cary D. Perttunen, Shelby Township, Mich.

[73] Assignee: Motorola, Inc., Schaumburg, Ill.

[21] Appl. No.: 08/710,820

[22] Filed: Sep. 23, 1996

[51] Int. Cl.[6] .................................................. G06F 15/16
[52] U.S. Cl. ............................. 395/200.57; 395/200.47; 395/200.33
[58] Field of Search .................................. 235/380–387; 380/20–25; 395/200.57, 200.47, 200.31, 200.33

[56] References Cited

U.S. PATENT DOCUMENTS

| | | | |
|---|---|---|---|
| 3,818,190 | 6/1974 | Silverman et al. | 235/382 |
| 3,999,042 | 12/1976 | Silverman et al. | 235/382 |
| 4,841,132 | 6/1989 | Kajitani et al. | 235/472 |
| 5,583,940 | 12/1996 | Vidrascu et al. | 380/49 |
| 5,590,197 | 12/1996 | Chen et al. | 380/24 |
| 5,602,918 | 2/1997 | Chen et al. | 380/21 |
| 5,613,012 | 3/1997 | Hoffman et al. | 382/115 |
| 5,640,002 | 6/1997 | Ruppert et al. | 235/472 |
| 5,640,193 | 6/1997 | Wellner | 348/7 |
| 5,640,565 | 6/1997 | Dickinson | 395/683 |
| 5,677,955 | 10/1997 | Doggett et al. | 380/24 |
| 5,694,471 | 12/1997 | Chen et al. | 380/25 |
| 5,745,389 | 4/1998 | Russell | 364/580 |

OTHER PUBLICATIONS

Article from the Internet:—Web TV, author Chris O'Malley, pp. 49–53.

From the Internet:—Discover the World Wide Web with Your Sportster, Second Edition, author Neil Randall.

From the Internet:—"Advertising" p. 1 of 1, and "The Anonymizer FAQ" pp. 1 to 5, Copyright 1995–1996, Community ConneXion, Inc.

*Primary Examiner*—Mehmet B. Geckil
*Attorney, Agent, or Firm*—James E. Gauger

[57] ABSTRACT

An electronic network navigation device (10) comprises a substrate (12) which supports a human-viewable image (14) and machine-readable data (16). The human-viewable image is associated with an electronic address, and the machine-readable data includes navigation instructions for linking to the electronic address. A network access apparatus (24) utilizes a data reader (30) to read the machine-readable data (16). The network access apparatus (24) links to the electronic address based upon the navigation instructions.

50 Claims, 3 Drawing Sheets

ELECTRONIC NETWORK NAVIGATION DEVICE AND METHOD FOR LINKING TO AN ELECTRONIC ADDRESS THEREWITH

FIELD OF THE INVENTION

The present invention relates to methods and systems for navigating an electronic network.

BACKGROUND OF THE INVENTION

The introductory chapter of *Discover the World Wide Web with Your Sportster*, Second Edition, provides a commentary on the present state of the Internet and the World Wide Web. In the above reference, it is stated that the Internet is in need of an application which will transform the "much-hyped but difficult-to-use linking of computers around the world to being a highly informative, highly usable database and communications tool." It is further stated that the various available Web browsers (e.g. Mosaic and Netscape Navigator) all have difficulties and limitations which make them insufficient to handle the complexity of the Internet.

Part of the problem is in the complexity of addressing a resource on the World Wide Web. The World Wide Web uses an addressing system known as a URL (Uniform Resource Locator) that defines the Location of a resource on the Internet. URLs are comprised of up to four parts: a protocol, a domain name, a path, and a filename. The combination of these four parts can produce a complex address for a resource. For example, the address for information on two-way pagers or the Motorola home page is:

http://www.mot.com/MIMS/MSPG/Products/Two-way/tango/desc.html.

Another part of the problem is in the rapid increase of the number of entities and the number of resources on the World Wide Web. Many entities are finding that domain names which they desire are already reserved. As a result, some entities have to purchase their desired domain name from another holder, or have to reserve a less than desirable domain name. Further, as the number of resources increases, newly-formed URLs become less intuitive and greater in length.

Resolving the problem of address complexity becomes even more important as various companies propose Internet navigation systems for the masses. For example, Netscape Communications Corporation has recently announced the formation of an independent software company to weave its technology into such consumer goods as telephones, televisions, and game machines.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Embodiments of the present invention advantageously provide an electronic network navigation device for linking a user to an electronic address. The device preferably includes a human-viewable image associated with a resource at an electronic address and machine-readable data for linking to the electronic address. A user may link to the electronic address by reading the machine-readable data using a data reader rather than by typing an electronic address. As a result, the addressing format and the address itself become substantially transparent to the user. Consequently, the problem of address complexity is addressed and the importance of reserving desired domain names is reduced. The device is well-suited for utilization by the masses to navigate to desired locations on the Internet and the World Wide Web.

Figure 1:
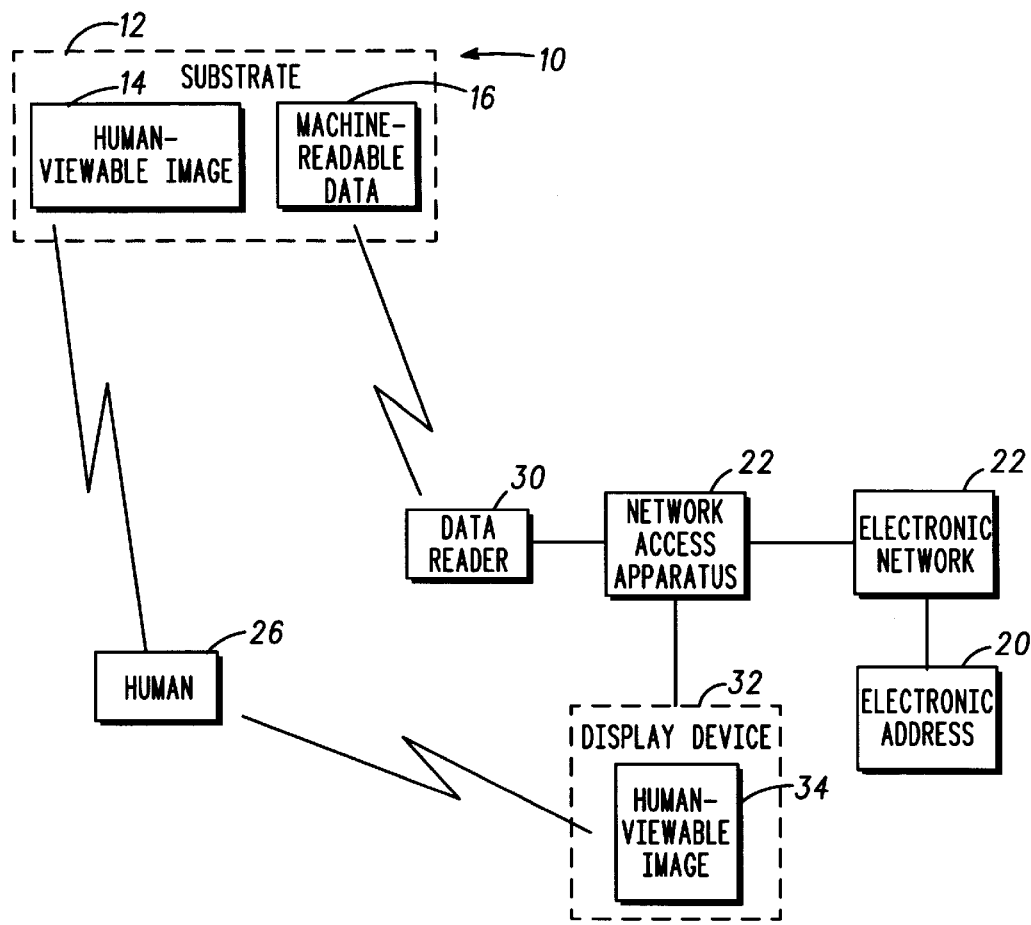
FIG. 1 is a block diagram of an embodiment of a network navigation device in accordance with the present invention.

FIG. 1 is a block diagram of an embodiment of a network navigation device 10 in accordance with the present invention. The network navigation device 10 comprises a substrate 12, a human-viewable image 14 supported by the substrate 12, and machine-readable data 16 supported by the substrate 12. The human-viewable image 14 is indicative of a resource at an electronic address 20 in an electronic network 22. The machine-readable data 16 provides navigation instructions for automatically linking a network access apparatus 24 to the electronic address 20 via the electronic network 22. The machine-readable data 16 can further include instructions which directs the network access apparatus 24 to execute a predetermined network access routine, e.g. a Web browser routine, a Telnet client routine, or others subsequently described.

Although embodiments of the present invention can be advantageously utilized for any electronic network having an electronic addressing scheme for identifying servers and information contained therein, of particular interest are embodiments of the present invention where the electronic network 22 includes the Internet, the World Wide Web, or an intranet. Here, the electronic address 20 can have the form of a URL or an IP (Internet Protocol) address.

Preferably, the substrate 12 is formed by a substantially flat piece of material. Examples of materials which can be utilized to form the substrate 12 include, but are not limited to, dielectric materials such as paper, cardboard, and plastic, and substantially nonmagnetic materials. Preferably, the material and its thickness are selected so that the substrate 12 is stiff, yet flexible. It is noted that, in general, the substrate 12 need not be homogeneous, i.e. more than two materials can be utilized to form the substrate 12.

It is also preferred that the substrate 12 be shaped and sized to facilitate ease in handling by individuals, such as a human 26. For this purpose, the substrate 12 can be card-shaped. Here, for example, the substrate 12 can have the size of a business card, a credit card, an index card, a trading card (e.g. a baseball card), or a playing card (e.g. from a deck of playing cards). In other embodiments, the substrate 12 includes a page in a book, a magazine, a newspaper, or other printed publication. In general, the substrate 12 can have various shapes, such as rectangular, circular, oval, or polygonal shapes, and can have various sizes.

The human-viewable image 14 can be supported by the substrate 12 in a variety of ways. In one embodiment, the human-viewable image 14 is printed directly onto the substrate 12. In another embodiment, the human-viewable image 14 is printed onto a second substrate for affixing or adhering to a surface of the substrate 12. Here, for example, the second substrate can have an adhesive backing for affixing the human-viewable image 14 to the substrate 12. As another alternative, the human-viewable image 14 can be contained (e.g. sandwiched) within the substrate 12.

The human-viewable image 14 can include textual information and/or graphical information which provides a more intuitive or more understandable representation of a resource at the electronic address 20 in comparison to the electronic address 20 itself. As an example, to provide a network navigation device for the Motorola Web page on two-way pagers, the human-viewable image 14 can include textual information such as "Motorola" and/or "Two-Way Pagers", graphical information such as an image or an illustration of a Motorola two-way pager, or a combination of textual information and graphical information. Such a human-viewable image is more intuitive and more understandable to the human 26 than an electronic address having the form of http://www. mot.com/MIMS/MSPG/Products/Two-way/tango/desc.html.

The machine-readable data 16 can be supported by the substrate 12 in a variety of ways. In embodiments where the machine-readable data 16 includes printed data representative of the navigation instructions, the machine-readable data 16 can be printed directly onto the substrate 12, printed onto a second substrate for affixing or adhering to a surface of the substrate 12, or can be contained within the substrate 12. In these embodiments, the printed data can include a bar code, such as a one-dimensional or a two-dimensional bar code, representative of the navigation instructions. Examples of one-dimensional bar codes include, but are not limited to, 3 of 9, UPC-A, Code 128, Codabar, MSI, Extended 3 of 9, Code 93, Extended Code 93, Industrial 2 of 5, Standard 2 of 5, Code 11, and UCC/EAN-128. Examples of two-dimensional bar codes include, but are not limited to, Data Matrix and PDF417.

Typically, the printed machine readable data is not readily interpretable or not readily discernible by the human 26. For example, although a human may be specially trained to mentally decode a bar code, such a code is practically indiscernible by most humans. Further, the printed data can be either visible or invisible to the human 26.

In embodiments where the machine-readable data 16 includes magnetically-stored data, the machine-readable data 16 can be: (i) stored directly onto a portion of the substrate 12 having a magnetic storage medium; (ii) stored onto a magnetic storage medium for affixing to the substrate 12; or (iii) stored onto a magnetic storage medium contained (e.g. sandwiched) within the substrate 12.

In embodiments where the machine-readable data 16 includes electronically-stored data, the machine-readable data 16 can be stored in a memory device integrated with the substrate 12. In these embodiments, the electronically-stored data can be externally accessed via an interface integrated with the network navigation device 10, or via a transmitter integrated with the network navigation device 10.

The machine-readable data 16 is communicated to the network access apparatus 24 by a data reader 30. The form of the data reader 30 is dependent upon the form of the machine-readable data 16. For printed data, the data reader 30 can include an optical imaging reader such as a scanning wand, a linear CCD (charge coupled device) reader, or a two-dimensional CCD reader. For magnetically-stored data the data reader 30 can include a magnetic read head, such as those within a magnetic stripe reader. For electronically-stored data, the data reader 30 can include an electronic interface or a receiver.

The network access apparatus 24 can have a variety of forms, including but not limited to, a general purpose computer, a network computer, a network television, an internet television, a cable modem and a portable wireless device. A display device 32, such as a monitor or a television, is coupled to the network access apparatus 24 to display a visual content of the resource upon linking to the electronic address 20. To reinforce the intuitive association between the network navigation device 10 and the electronic address 20, an image 34 viewable on the display device 32 upon linking to the electronic address 20 is similar to (or can be equivalent to) at least a portion of the human-viewable image 14. Examples of image 34 include any suitable image such as a 2D image, text, a perspective 3D image, or a perspective corrected portion of a wide angle image, such as a 360 degree photosphere or photobubble available from omniview at www.omniview.com.

FIGS. 2 to 6 illustrate various examples of embodiments of the network navigation device 10. It is noted that the teachings herein can be interchanged among the various examples to form additional embodiments.

Figure 2:
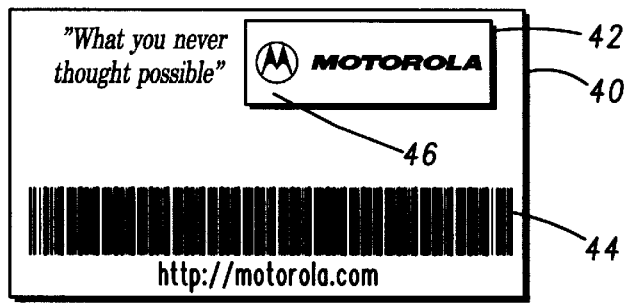
FIG. 2 is an illustration of a first embodiment of a network navigation device in accordance with the present invention.

FIG. 2 is an illustration of a first embodiment of a network navigation device in accordance with the present invention. The network navigation device includes a substrate 40 which supports a human-viewable image 42 and machine-readable data 44. The machine-readable data 44 includes a bar code representation of the full URL of the Motorola home page on the World Wide Web (in particular, http://motorola.com).

The human-viewable image 42 includes an image which is viewable upon linking to the Motorola home page. Included in the human-viewable image 42 is textual information such as "Motorola" and the "What you never thought possible" trademark. The human-viewable image 42 further includes graphical information such as the Motorola logo 46.

In the embodiment illustrated in FIG. 2, the substrate 40 has the size of a business card (3.5 inches by 2 inches). Preferably, the substrate 40 is formed entirely of a dielectric and/or nonmagnetic material such as paper, cardboard, or plastic. These materials are advantageous for producing a network navigation device which is inexpensive, and hence, can be disposed after use.

The human-viewable image 42 and the machine-readable data 44 can be printed directly onto the substrate 40. Alternatively, the human-viewable image 42 and the machine-readable data 44 can be printed onto a second substrate, which is thereafter affixed to the substrate 40.

Figure 3:
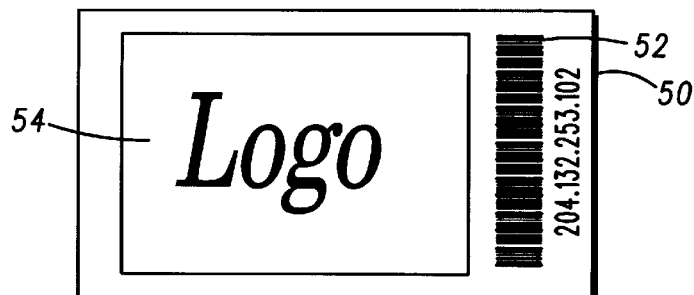
FIG. 3 is an illustration of a second embodiment of a network navigation device in accordance with the present invention.

FIG. 3 is an illustration of a second embodiment of a network navigation device in accordance with the present invention. The network navigation device includes a substrate 50 which can be similarly sized and shaped, and of a similar material as the substrate 40 in FIG. 2. The substrate 50 supports machine-readable data 52 which provides a bar code representation of the IP address of the Discovery Channel's home page on the World Wide Web (in particular, 204.132.253.102). The substrate also supports a human-viewable image 54 which intuitively conveys to a user that the network navigation device is for linking to Discovery Channel Online. To reinforce the association between the network navigation device and the electronic address, the human-viewable image 54 corresponds to an image which is viewable upon linking to the Discovery Channel home page.

The use of a printed image and printed data on a paper or cardboard substrate, such as in FIGS. 2 and 3, provides a number of advantages. A first advantage is that the resulting network navigation device can be produced inexpensively for wide distribution. For example, these network navigation devices can be: (i) included as inserts in magazines, newspapers, or other publications; (ii) stacked into decks and packaged for distribution by mail or for marketing in stores; and/or (iii) distributed as one distributes business cards. A second advantage is that a user can rapidly thumb through a number of network navigation devices to find network resources of interest by viewing the image on each network navigation device. In addition, the network navigation devices can be collected and traded in a manner similar to trading cards.

In addition, the use of a printed image and printed data allows for network navigation devices to be formed on pages of a book, magazine, newspaper, or other publication. In general, each page can define a single network navigation device, or can define a plurality of network navigation devices. If desired, a page defining a plurality of network navigation devices can be perforated to allow for separation into individual network navigation devices.

In one application, the printed image can include a figure in a book or the like. Here, the printed data may be utilized to link a user to an electronic address having information associated with the figure. If desired, the printed data can be included in a caption for the figure. In another application, a plurality of pages of network navigation devices are assembled to form a directory of electronic addresses.

Figure 4:
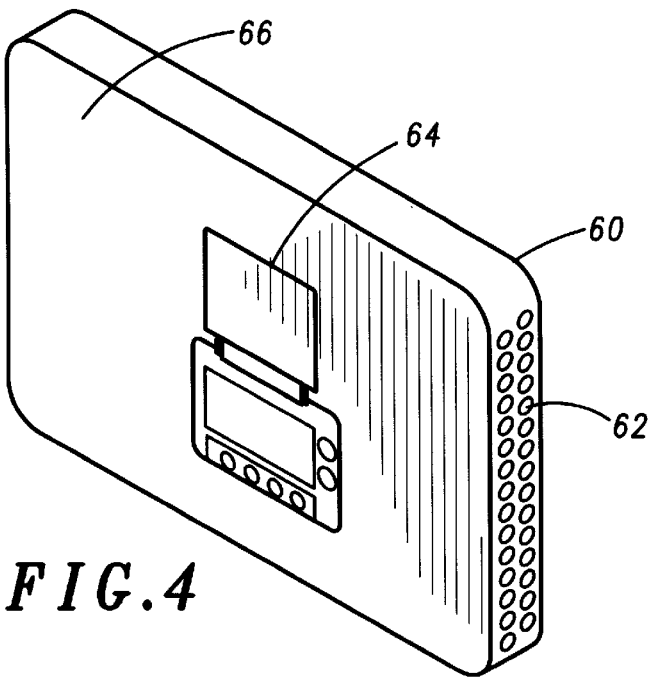
FIG. 4 illustrates a third embodiment of a network navigation device in accordance with the present invention.

FIG. 4 illustrates a third embodiment of a network navigation device in accordance with the present invention. The network navigation device includes a PCMCIA memory card 60 having stored therein machine-readable data representative of navigation instructions for linking to an electronic address. The PCMCIA memory card 60 has a PCMCIA interface 62 for communicating the machine-readable data to a data reader with a mating PCMCIA interface.

The PCMCIA memory card 60 supports an externally-viewable image 64 at an exterior surface 66. Hence, the substrate as described earlier includes a portion of the housing of the PCMCIA memory card 60.

In this example, the externally-viewable image 64 includes an image of a Tango two-way pager available from Motorola. The machine-readable data includes a representation of the URL for information on the Tango two-way pager on the World Wide Web, which is http://www.mot.com/MIMS/MSPG/Products/Two-way/tango/.

Figure 5:
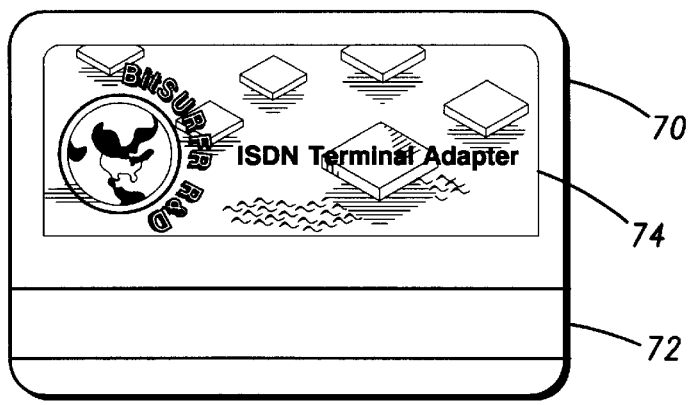
FIG. 5 illustrates a fourth embodiment of a network navigation device in accordance with the present invention.

FIG. 5 illustrates a fourth embodiment of a network navigation device in accordance with the present invention. The network navigation device includes a substrate 70 which supports a magnetic storage medium 72. In the example of FIG. 5, the magnetic storage medium 72 has the form of a magnetic stripe, although alternative forms can be utilized. The magnetic storage medium 72 stores machine-readable data providing navigation instructions for linking to an electronic address. The machine-readable data is communicated to a data reader having a magnetic reading head, such as a magnetic stripe reader.

The substrate 70 supports a human-viewable image 74 indicative of a resource at the electronic address. In this example, the human-viewable image 4 includes an illustration of Motorola's BitSURFR modems. Accordingly, the magnetic storage medium 72 can store a representation of the URL for obtaining information on Motorola's BitSURFR modems, which is http://www.mot.com/MIMS/ISG/Products/bitsurfr_pro/.

In the embodiment illustrated in FIG. 5, the substrate 70 has the size of a credit card (3.375 inches by 2.25 inches). Preferably, the substrate 70 is formed entirely of a dielectric and/cr nonmagnetic material such as paper, cardboard, or plastic. Here, the only magnetic material in the network navigation device is within the magnetic storage medium 72.

Figure 6:
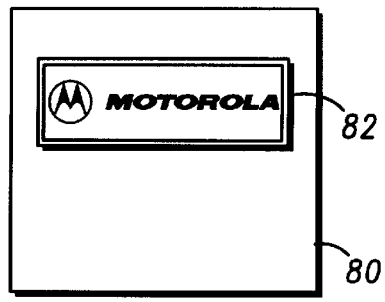
FIG. 6 illustrates a fifth embodiment of a network navigation device in accordance with the present invention.

FIG. 6 illustrates a fifth embodiment of a network navigation device in accordance with the present invention. The network navigation device includes a radio frequency tag 80 containing navigation instructions for linking to an electronic address. The radio frequency tag 80 includes a memory containing data representative of the navigation instructions, and a transmitter which transmits a signal representative of the data for external reception. The memory can be either read-only or read-write. In general, the radio frequency tag 80 can be either active (i.e. having an internal battery for powering its circuits) or passive (i.e. powering its circuits using externally-generated power).

Various commercially-available radio frequency tags can be utilized for the radio frequency tag 80, including but not limited to, tags produced by Indala Corporation and the MicroStamp RIC (Remote Intelligent Communication) tags available from Micron Communications, Inc. Illustrated in FIG. 6. is a network navigation device based on the MicroStamp RIC unit, which is postage-stamp sized (1.25 inches by 1.25 inches).

A human-viewable image 82 is supported by an exterior surface of the radio frequency tag 80. Hence, the substrate as described earlier includes a portion of the housing of the radio frequency tag 80. In this example, the human-viewable image 82 includes the Motorola logo, which indicates that the navigation instructions will link a user to an electronic address which provides information about Motorola, Inc.

Figure 7:
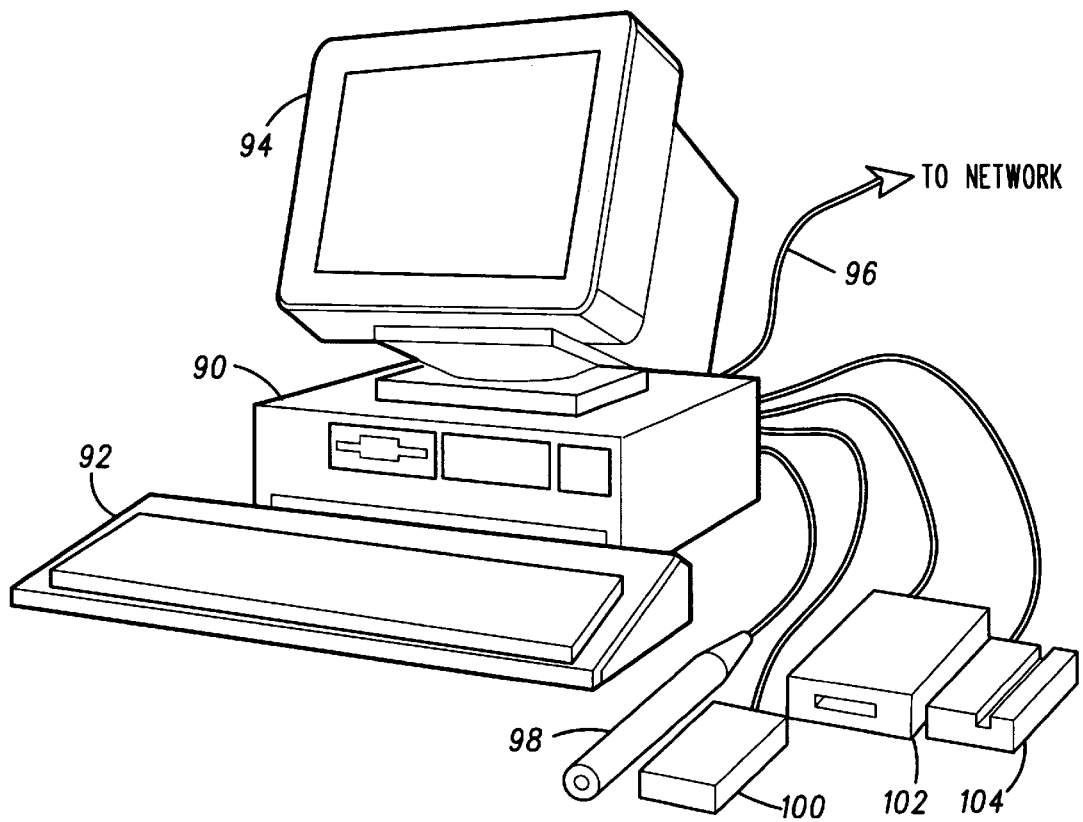
FIG. 7 illustrates an example of a network access apparatus and examples of various data readers for reading machine-readable data from a network navigation device.

FIG. 7 illustrates an example of a network access apparatus and examples of various data readers for reading machine-readable data from a network navigation device. In this example, the network access apparatus includes a personal computer 90 having an input interface, such as a keyboard 92, and a display device, such as a monitor 94, coupled thereto.

The personal computer 90 communicates with an electronic network via a line 96, which can include a telephone line, an ISDN line, a cable televisior line, a fiber optic line, a computer network line, or the like. Alternatively, the personal computer 90 can wirelessly communicate with the electronic network. Based on the mode of communication with the electronic network, the personal computer 90 can include a modem and/or a transceiver to communicate with the electronic network. The electronic network can be provided by an online service, an Internet service Provider, a local area network service, a wide area network service, a cable television service, a wireless data service, an intranet, or the like.

The various data readers coupled to the personal computer 90 include a bar code reader 98, an RF tag reader 100, a PCMCIA card reader 102, and a magnetic stripe reader 104. The data readers may be coupled wirelessly or by a wireline connection. The bar code reader 98 is utilized to read bar-coded navigation instructions from a network navigation device, such as those illustrated in FIGS. 2 and 3. The RF tag reader 100 is utilized to receive and decode an electromagnetic signal representative of the navigation instructions generated by an RF tag, such as one illustrated in FIG. 6. The PCMCIA card reader 102 interfaces with a PCMCIA card, such as one illustrated in FIG. 4, to read navigation instructions stored therein. The magnetic stripe reader 104 reads magnetically-stored navigation instructions stored by a magnetic stripe, such as one illustrated in FIG. 5.

It is noted that the bar code reader 98 illustrative of any optical reading device which can be utilized. Similarly, the PCMCIA card reader 102 is illustrative of any memory card reader which can be utilized, and the magnetic stripe reader 104 is illustrative of any magnetic reading device which can be utilized.

Figure 8:
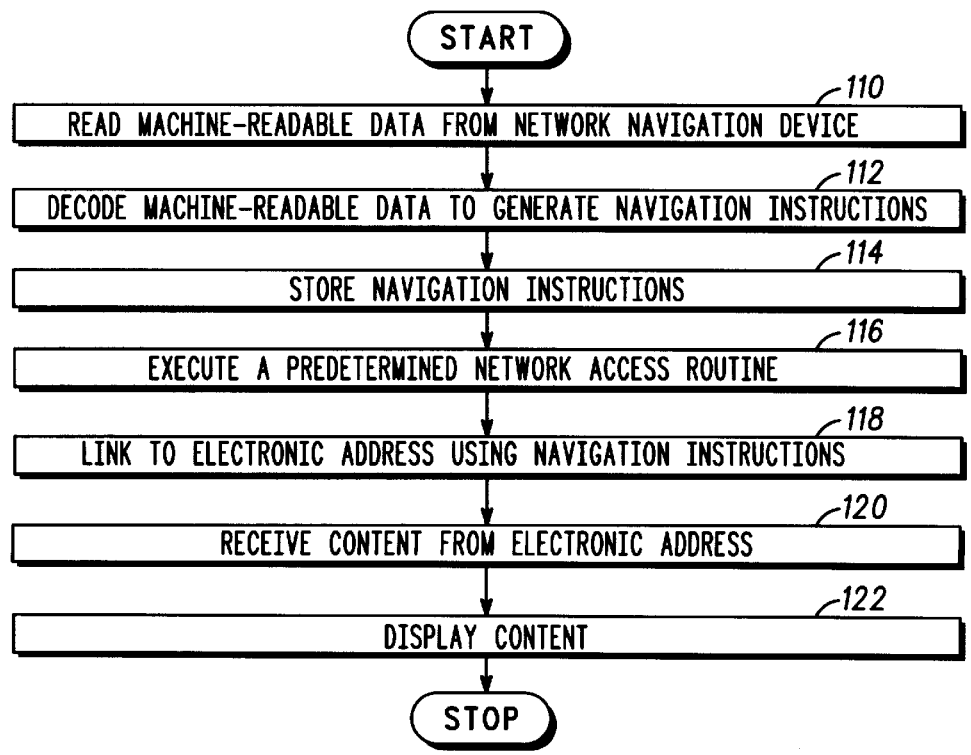
FIG. 8 is a flow chart of an embodiment of a method of linking to an electronic address in an electronic network.

FIG. 8 is a flow chart of an embodiment of a method of linking to an electronic address in an electronic network. The method can be utilized by the network access apparatus 24 in FIG. 1 to automatically link a user to the electronic address encoded on the network navigation device 10. Typically, the user selects a desired electronic address to visit based upon the human-viewable image 14 associated therewith on the network navigation device 10.

As indicated by block 110, the method includes a step of reading machine-readable data from a network navigation device. The machine-readable data can be read using the data reader 30. The specific type of data reader utilized is selected based upon how the machine-readable data is stored on the network navigation device.

As indicated by block 112, a step of decoding the machine-readable data is performed to generate navigation instructions. The navigation instructions tell the network navigation apparatus 24 how to link to the electronic address. As described earlier, the navigation instructions can include at least a portion of a URL or at least a portion of an IP address. If a partial address is received, an additional step of completing the electronic address can be performed. For example, if an IP address is received, such as from the bar code for 204.132.253.102 illustrated in FIG. 3, the IP address can be prepended by "http://" in this step.

It is noted that a URL can includes up to four parts: a protocol, a domain name, a path, and a filename. URL protocols include: "file:" for accessing a file stored on a local storage medium; "ftp:" for accessing a file from an FTP (file transfer protocol) server; "http:" for accessing an HTML (hypertext marking language) document; "gopher:" for accessing a Gopher server; "mailto:" for sending an e-mail message; "news:" for linking to a Usenet newsgroup; "telnet": for opening a telnet session; and "wais:" for accessing a WAIS server. Consequently, network navigation devices in accordance with the present invention can be utilized for automatically initiating any of the above tasks.

Optionally, a step of storing the navigation instructions is performed as indicated by block 114. The navigation instructions can be stored as a bookmark or stored in a favorites list, such as those available in many Web browsers, to provide a shortcut to the electronic address. Thereafter, a user can link to the electronic address by selecting the shortcut rather than having to re-read the navigation instructions from the network navigation device.

Preferably, a representation of the human-viewable image 14 is stored to provide an iconic representation for the shortcut to the electronic address. As a result, the association between the human-viewable image 14 and the resource at the electronic address 20 is further reinforced. To facilitate storing a representation of the human-viewable image 14, the machine-readable data can include machine-readable data representative of the human-viewable image 14 which is read in block 110. Alternatively, the human-viewable image 14 can be optically scanned into the network access apparatus 24 using a page scanner or the like. As another alternative, an electronic representation of the human-viewable image 14 can be downloaded from the electronic address 20 upon linking thereto.

As indicated by block 116, a step of executing a predetermined network access routine is performed. The step of executing the predetermined network access routine can include any of: (i) executing a routine to connect and/or logon to a service provider (e.g. executing a dial-up routine or a wireless authentication routine to connect to a service provider); and (i) executing a client routine for subsequent user interaction with the electronic address (e.g. executing a graphical user interface routine or a Web browsing routine).

The step of executing the predetermined network access routine can be executed prior to reading the machine-readable data in block 110. Alternatively, the predetermined network access routine can be automatically initiated upon reading the machine-readable data in block 110. Here, the machine-readable data 16 can include instructions for directing the initiation of the predetermined network access routine, and for directing which predetermined network access routine is to be executed.

In particular, the machine-readable data 16 can include instructions for directing the type and the specifics of the connection to be made to the electronic network 22. These instructions can dictate whether a wireline connection or a wireless connection should be made, and/or which wireline connection or which wireless connection should be made. As a result, the instructions on one network navigation device may direct a connection to a first service provider (e.g. America Online) while the instructions on another network navigation device direct a connection to a second service provider (e.g. CompuServe).

Further, the machine-readable data 16 can include instructions for selecting which client routine is to be executed. As a result, the instructions or one network navigation device may direct that a first graphical user interface routine (e.g. Netscape Navigator) be executed, while the instructions on another network navigation device direct a that second graphical user interface routine (e.g. Microsoft Internet Explorer) be executed.

As indicated by block 118, the method includes a step of linking to the electronic address using the navigation instructions. This step typically includes transmitting the navigation instructions to the electronic network 22 to establish the Link to the electronic address 20.

As indicated by block 120, the method includes a step of receiving content from electronic address 20 once the link is established. The content from the electronic address 20 can include audible information and/or visual information, such as graphical information and/or textual information. Examples of the content include, but are not limited to, a file from a local hard drive, a file from a FTP server, an HTML document, content from a Gopher server, a message from a newsgroup, a transmission from a Telnet session, and a transmission from a WAIS server.

As indicated by block 122, the method includes a step of displaying the content from the electronic address 20. As described earlier, the content can include an image which corresponds to at least a portion of the human-viewable image 14 on the network navigation device 10.

An article of manufacture can be formed to direct a network access apparatus to perform the above-described steps. The article of manufacture can include a computer-readable storage medium having computer-readable data stored therein which directs the network access apparatus to perform the above-described steps. Examples of the computer-readable storage medium include, but are not limited to, a logic circuit, a memory, a mass storage medium, an optical disk, a CD-ROM, a magnetic disk, a floppy disk, a hard disk, and a PCMCIA card.

Thus, there has been described herein several embodiments including preferred embodiments of a network navigation device and method for linking to an electronic address therewith.

Because the various embodiments of the present invention provide a device having a human-viewable image which is intuitively associated with a resource at an electronic address and machine-readable data for linking to the electronic address, they provide a significant improvement in that the addressing format and the address itself may become transparent to the user. Consequently, the problem of address complexity is addressed using embodiments of the network navigation device. Further, the dependency on reserving desired domain names is reduced.

The intuitive association between the human-viewable image and the electronic address can be reinforced by including at least a portion of the human-viewable image within the content provided by the electronic address, or within an iconic representation of a shortcut link to the electronic address in a graphical user interface.

Additionally, the various embodiments of the present invention as herein-described allows a user to automatically establish a connection to an electronic network and automatically execute a client routine upon reading the machine-readable data from the network navigation device. As a result, the process of initiating the connection (e.g. dialing a service provider and logging on) and executing the client routine (e.g. the Web browser) may become transparent to the user.

Further, the various embodiments of the present invention as herein-described provide network navigation devices which can be inexpensively produced for wide distribution, are easy to handle for selecting electronic addresses of interest, can be collected and traded like trading cards, and can be disposed or discarded after use.

It will be apparent to those skilled in the art that the disclosed invention may be modified in numerous ways and may assume many embodiments other than the preferred form specifically set out and described above.

Accordingly, it is intended by the appended claims to cover all modifications of the specific embodiments disclosed herein which fall within the true spirit and scope of the invention.

What is claimed is:

1. An electronic network navigation device dedicated for linking to a single electronic address, the electronic network navigation device comprising:

a substrate;

a human-viewable image supported by the substrate, the human-viewable image associated with the single electronic address; and printed data supported by the substrate, the printed data comprising a first machine-readable instruction to select a client routine to be executed by a network access apparatus and a second machine-readable instruction to link the network access apparatus to the single electronic address, wherein the first machine-readable instruction is used by the network access apparatus to select the client routine to be executed from a plurality of client routines which are executable by the network access apparatus.

2. The electronic network navigation device of claim 1 wherein the second machine-readable instruction includes a partial uniform resource locator for the single electronic address.

3. The electronic network navigation device of claim 1 wherein the second machine-readable instruction includes at least a portion of an internet protocol address.

4. The electronic network navigation device of claim 1 wherein the human-viewable image is printed.

5. The electronic network navigation device of claim 1 wherein at least a portion of the human-viewable image corresponds to an image viewable using the network access apparatus upon linking to the single electronic address.

6. The electronic network navigation device of claim 1 wherein the printed data is not readily interpretable by a user.

7. The electronic network navigation device of claim 1 wherein the printed data includes a bar code representative of the first machine-readable instruction.

8. The electronic network navigation device of claim 1 wherein the substrate is card-shaped.

9. The electronic network navigation device of claim 1 wherein the substrate is formed substantially of a dielectric material.

10. The electronic network navigation device of claim 1 wherein the substrate is formed substantially of a nonmagnetic material.

11. The electronic network navigation device of claim 1 wherein the substrate is formed of paper.

12. The electronic network navigation device of claim 1 wherein the substrate is formed of cardboard.

13. The electronic network navigation device of claim 1 wherein the client routine includes a Web browser routine.

14. The electronic network navigation device of claim 1 wherein the substrate is formed of a substantially dielectric and nonmagnetic material, and wherein at least a portion of the human-viewable image corresponds to an image viewable using the network access apparatus upon linking to the single electronic address.

15. The electronic network navigation device of claim 14 wherein the printed data comprises a bar code representative of the first instruction.

16. A method of linking to an electronic address, the method comprising the steps of:

machine-reading printed data from a network navigation device dedicated for linking to the electronic address, the printed data providing a first instruction and a second instruction;

selecting a client routine from a plurality of executable client routines based upon the first instruction;

executing the client routine; and linking to the electronic address using the second instruction.

17. The method of claim 16 wherein the second instruction includes at least a portion of a URL for the electronic address.

18. The method of claim 16 wherein the second instruction includes at least a portion of an IP address for the electronic address.

19. The method of claim 16 wherein the network navigation device has a human-viewable image associated with the electronic address, the method further comprising the step of displaying an image which corresponds to at least a portion of the human-viewable image upon linking to the electronic address.

20. The method of claim 16 wherein the printed data is not readily interpretable by a user.

21. The method of claim 16 wherein the printed data includes a bar code representative of the first instruction.

22. The method of claim 16 wherein the step of machine-reading the printed data comprises machine-reading the printed data from a substantially dielectric material.

23. The method of claim 16 wherein the step of machine-reading the printed data comprises machine-reading the printed data from a substantially nonmagnetic material.

24. The method of claim 16 wherein the step of machine-reading the printed data comprises machine-reading the printed data from paper.

25. The method of claim 16 further comprising retrieving and displaying content based on the electronic address.

26. The method of claim 16 wherein the step of executing the client routine includes executing a Web browser routine.

27. The method of claim 16 further comprising the step of storing the first instruction and the second instruction to provide a shortcut to the electronic address.

28. The method of claim 27 wherein the network navigation device has a human-viewable image associated with the electronic address, the method further comprising the step of storing a representation of the human-viewable image to provide an iconic representation for the shortcut.

29. The method of claim 28 wherein the representation of the human-viewable image is read from the network navigation device.

30. The method of claim 28 wherein the representation of the human-viewable image is received from the electronic address.

31. The method of claim 16 wherein the network navigation device has a human-viewable image associated with the electronic address, the method further comprising the steps of displaying an image which corresponds to at least a portion of the human-viewable image upon linking to the electronic address.

32. The method of claim 31 wherein the printed data comprises a bar code representative of the first instruction.

33. An article of manufacture which directs a network access apparatus to link to an electronic address, the article of manufacture comprising:
 a computer-readable storage medium; and
 computer-readable data stored on the computer-readable storage medium, the computer-readable data to direct steps of reading printed data including a first instruction and a second instruction from a network navigation device dedicated for linking to the electronic address, selecting a client routine from a plurality of executable client routines based upon the first instruction, executing the client routine, and linking to the electronic address using the second instruction.

34. The article of manufacture of claim 33 wherein the first instruction includes at least a portion of a URL for the electronic address.

35. The article of manufacture of claim 33 wherein the first instruction includes at least a portion of an IP address for the electronic address.

36. The article of manufacture of claim 33 wherein the network navigation device has a human-viewable image associated with the electronic address, wherein the computer-readable data further directs a step of displaying an image which corresponds to at least a portion of the human-viewable image upon linking to the electronic address.

37. The article of manufacture of claim 33 wherein the printed data is not readily interpretable by a user.

38. The article of manufacture of claim 33 wherein the printed data includes a bar code representative of the first instruction.

39. The article of manufacture of claim 33 wherein the step of reading the printed data includes reading the printed data from a substantially dielectric material.

40. The article of manufacture of claim 33 wherein the step of reading the printed data includes reading the printed data from a substantially nonmagnetic material.

41. The article of manufacture of claim 33 wherein the step of reading the printed data includes reading the printed data from a substrate formed of paper.

42. The article of manufacture of claim 33 wherein the step of reading the printed data includes reading the printed data from a substrate formed of cardboard.

43. The article of manufacture of claim 33 wherein the step of executing the client routine includes executing a Web browser routine.

44. The article of manufacture of claim 33 wherein the computer-readable data further directs a step of storing the first instruction and the second instruction to provide a shortcut to the electronic address.

45. The article of manufacture of claim 44 wherein the network navigation device has a human-viewable image associated with the electronic address, wherein the computer-readable data further directs a step of storing a representation of the human-viewable image to provide an iconic representation for the shortcut.

46. The article of manufacture of claim 45 wherein the representation of the human-viewable image is read from the network navigation device.

47. The article of manufacture of claim 45 wherein the representation of the human-viewable image is received from the electronic address.

48. The article of manufacture of claim 33 wherein the network navigation device has a human-viewable image associated with the electronic address, and wherein the computer-readable data further directs a step of displaying an image which corresponds to at least a portion of the human-viewable image upon linking to the electronic address.

49. The article of manufacture of claim 48 wherein the printed data comprises a bar code representative of the first instruction.

50. An electronic network navigation device dedicated for linking to a single electronic address, the electronic network navigation device comprising:
 a substrate; and
 printed data supported by the substrate, the printed data comprising a first machine-readable instruction to select a client routine to be executed by a network access apparatus and a second machine-readable instruction to automatically link the network access apparatus to the single electronic address, wherein the first machine-readable instruction is used by the network access apparatus to select the client routine to be executed from a plurality of client routines which are executable by the network access apparatus.

* * * * *